Aug. 14, 1956

C. A. BADAVAS ET AL 2,758,752

MULTIPLE FEED HOPPER AND GATE ADJUSTMENT

Filed April 21, 1952

INVENTORS
CHARLES A. BADAVAS
CARL E. MAGNUSON

BY William C. Babcock ATTORNEY

Aug. 14, 1956    C. A. BADAVAS ET AL    2,758,752
MULTIPLE FEED HOPPER AND GATE ADJUSTMENT
Filed April 21, 1952
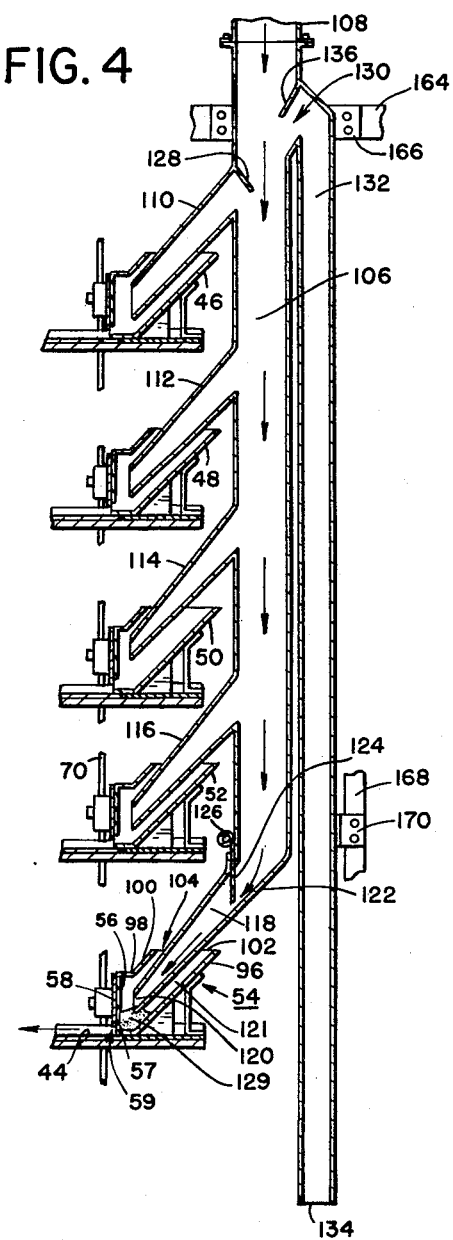
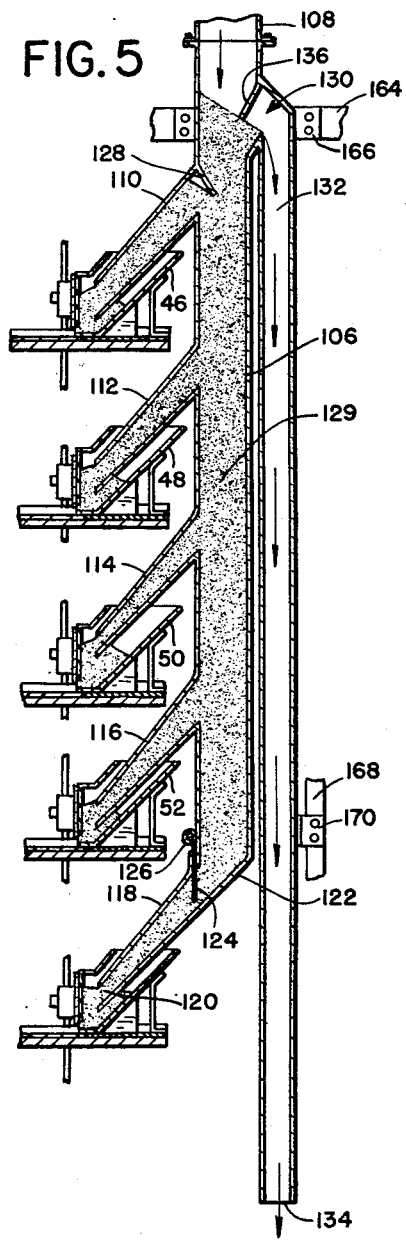
INVENTORS
CHARLES A. BADAVAS
CARL E. MAGNUSON
BY William C. Babcock ATTORNEY United States Patent Office 2,758,752
Patented Aug. 14, 1956

2,758,752

MULTIPLE FEED HOPPER AND GATE ADJUSTMENT

Charles A. Badavas and Carl E. Magnuson, Minneapolis, Minn., assignors to General Mills, Inc., a corporation of Delaware Application April 21, 1952, Serial No. 283,282

14 Claims. (Cl. 222—134)

The present invention relates to feeding mechanism, and more particularly to mechanism for distribution of a supply of material selectively to a plurality of processing units.

Certain devices have been proposed in the past for distribution of granular or free flowing solid materials from a single source of supply to a plurality of processing units such as screens, separators, or the like. In some of these devices a swinging or reciprocating hopper has fed the stock first to one unit and then the other in rapid sequence. In other devices, the screens or other processing units have been reciprocated beneath a single hopper or spout which discharges material on either one or the other processing units depending on the particular position of such units at the moment. So far as we are aware, however, these earlier devices do not provide a separate hopper for each unit, a common supply chute for the hoppers and means to control the selective feeding in such a manner that all of the material will be fed to one of the hoppers until the corresponding processing unit is operating at its optimum rate of capacity, after which further stock is diverted to another hopper and unit until the latter in turn reaches its optimum capacity.

It is accordingly one object of the present invention to provide a feeding mechanism for a multiple processing unit in which the stock will be distributed first to one hopper and processing unit and then to the others in succession, but only after each initial unit is operating at its optimum capacity.

A further object is a feeding mechanism in which a gravity chute has discharge spouts spaced along its length for distribution of stock to different feed hoppers, the chute being closed at its lower end except for the lowermost spout and having an overflow or discharge outlet at a point above the uppermost spout.

A further object is a feeding mechanism of this type in which such a gravity chute has feed spouts projecting downwardly into each feed hopper and thereby automatically choking off the feed to such hopper when the latter is operating at capacity.

A further object is a feeding mechanism of this type in which a plurality of individual feed hoppers is used to supply different processing units, with adjustable gate means for control of the rate of flow from each hopper, in combination with means for both individual and simultaneous adjustment of the feed gates for the respective hoppers.

Other objects and advantages of the present invention will be apparent from the following specification in which a preferred embodiment is particularly described.

In the drawings which form a part of this application,

Fig. 4 is a partial sectional view taken on the line 4—4 of Fig. 2 showing operation of the feeding mechanism when material is supplied at a low volume rate of flow, and Fig. 5 is a view similar to Fig. 4 showing operation of the feeding mechanism when material is supplied at a volume rate in excess of that accommodated by the respective hoppers and processing units.

Figure 1:
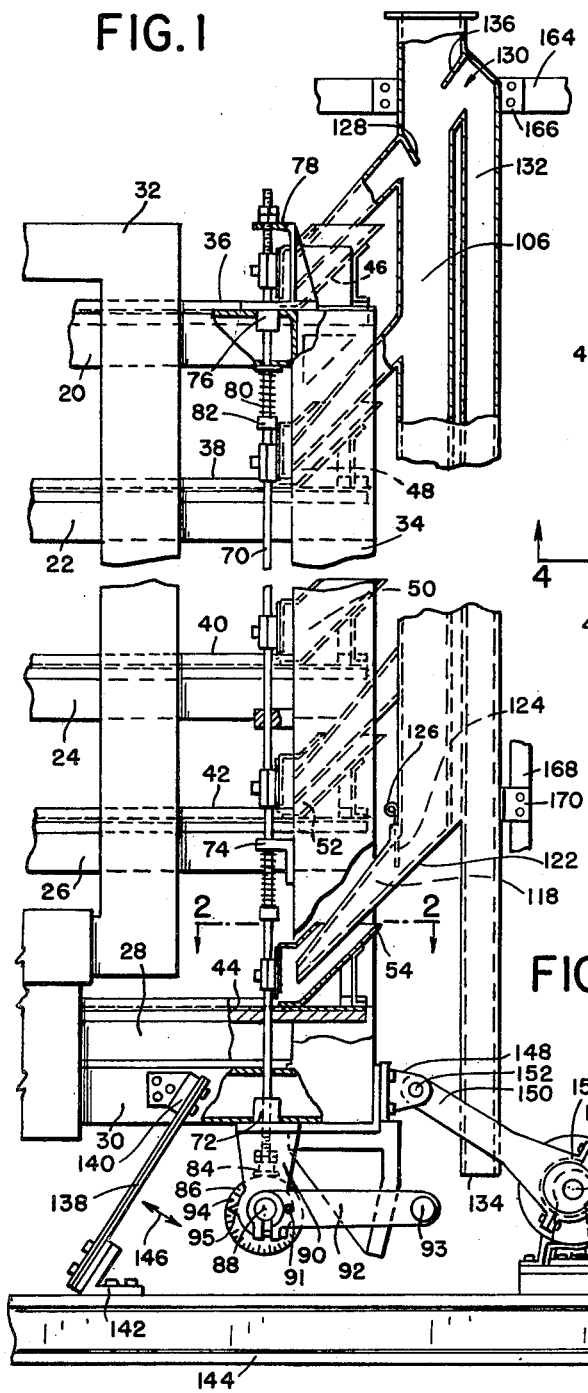
Figure 1 is a partial side view, with certain portions broken away for clearness, of a multiple processing unit and feeding mechanism according to the present invention.
Figure 2:
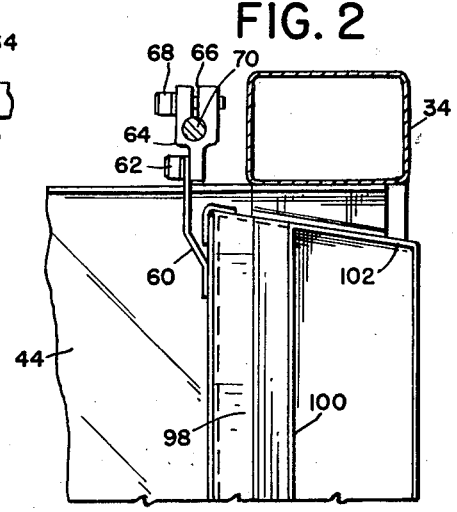
Fig. 2 is a sectional view on the line 2—2 of Fig. 1.
Figure 3:
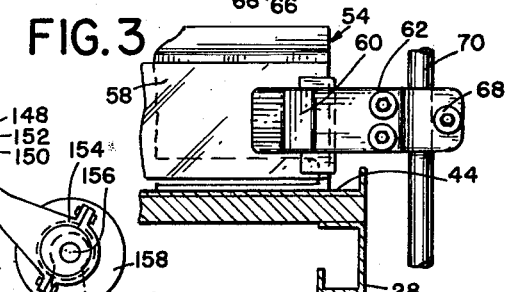
Fig. 3 is a partial sectional view of the gate attachment details taken on the line 3—3 of Fig. 2.

As shown in Fig. 1, the multiple processing unit which is illustrated includes a plurality of substantially horizontal frame members 20, 22, 24, 26, 28, and 30, which are vertically spaced with respect to each other. Vertically extending frame members 32 and 34 may serve to connect the horizontal frame members in the desired relative arrangement. The individual horizontal frame members 20, 22, etc., are designed to carry the desired processing units, such as screens or other separating units. If desired, these frame members may merely carry conveyers for guiding the material to other processing units.

Each of the horizontal frame members is provided with a feed deck as indicated at 36, 38, 40, 42, and 44. Associated with each feed deck is a feed hopper, as shown at 46, 48, 50, 52, and 54, respectively. In this case, the respective feed hoppers are vertically spaced with respect to each other and provide a means for distribution of material to the corresponding feed deck at the desired volume rate of flow.

As shown in Fig. 4, for example, the lower feed hopper 54 has a front wall portion 56 provided with an opening 57 at its lower edge adjacent the feed deck. This opening 57 represents the maximum opening, through which material can pass from hopper 54 to the feed deck 44. In order that the volume rate of flow may be changed to suit a particular set of conditions, an adjustable gate means is provided for hopper 54. This gate means is illustrated in the form of a vertically adjustable gate member 58 having its lower edge movable toward and away from the feed deck to provide a variable feed opening 59 for discharge of material from the hopper.

The vertically adjustable gate 58 is attached to and supported by projecting arms 60 at each end, and these arms 60 are connected at 62 to mounting blocks 64 at each side of the machine. Each mounting block is of split construction as shown at 66 and has a clamping bolt 68 by which the block 64 may be adjustably supported on control members 70. These control members 70 are illustrated as vertically movable rods supported in lower bearings 72, intermediate bearings 74, and upper bearings 76 and 78 on the frame of the machine. These bearings permit vertical sliding movement of the control members 70.

Springs 80 are mounted on the rods 70 between one of the frame members such as frame member 20 and a collar 82 fixed to the control rod 70, for the purpose of urging the control rods downwardly at all times. Thus the action of these springs tends to push the control rods and their associated feed gates 58 downwardly to close the feed openings of the respective hoppers.

For simultaneous adjustment of the control members and associated gates, the lower ends 84 of the control rods are urged against the periphery of a cam member 86 fixed to shaft 88 rotatably mounted in bearings 90 on the frame members.

A crank arm 92 provided with a handle 93 permits manual adjustment of the rotary position of shaft 88 and cam 86 thereby varying the vertical position of control members 70 and the size of the feed openings beneath the respective adjustable gates 58. A scale 94 on cam member 86 and an index 95 on support 90, or other suitable scale means, may be provided to facilitate adjustment of the gate openings to a particular size. A lock screw 91 may be provided to hold cam 86 and shaft 88 in adjusted position.

It will be understood that only one cam 86 is illustrated in Fig. 1, but that shaft 88 extends all the way across the machine and has similar cams on each end for simultaneous adjustment of the two control rods 70 at each side of the machine. Thus handle 93 may be used for simultaneous adjustment of the feed openings on all the hoppers, while the individual clamping bolts 68 on mounting blocks 64 provide a means for individual adjustment of any given feed gate 58 with respect to the control member and the remaining feed gates. Handle 93 may thus be used to lift all gates, whenever necessary for the passage of obstructions which may have lodged therein.

In Fig. 4 the remaining structure of hopper 54 is illustrated and includes a rearwardly and upwardly inclined wall portion 96 at the rear of the hopper, a top portion 98 intersecting the front wall 56 of the hopper, and an upwardly inclined top wall 100 projecting substantially parallel to rear wall 96. Side walls 102 between the wall portions 96 and 100 connect the latter and provide an upwardly facing inlet or top opening 104 at the upper portion of the hopper 54. Since the construction of all the hoppers may be substantially identical, the detailed description of hoppers 46, 48, 50, and 52 is omitted.

In order to supply the desired material to the respective hoppers in the manner set forth above, a gravity chute 106 is provided. In the embodiment shown in the drawings this chute 106 is substantially vertical and is provided at its upper end with a material inlet 108 connected to any suitable source of supply such as an earlier processing unit. The chute 106 has a plurality of feed spouts 110, 112, 114, 116, and 118 to guide material from the chute 106 to the respective feed hoppers 46, 48, 50, 52, and 54.

These feed spouts are substantially similar and as shown in the case of the lower spout 118 in Fig. 4, each spout extends downwardly into the corresponding feed hopper to a point well below the tops of the hopper walls providing the hopper inlet. Thus the end 120 of spout 118 is located within the hopper below the closed top 98 of the hopper. The feed spout fills a substantial portion of the hopper inlet 104 and thus leaves a relatively narrow passage 121 surrounding the spout 118 and located between the spout and the hopper walls 96, 100, and 102. The overlapping of the spout and hopper walls in this fashion provides a sort of choke or automatic shut-off which stops the flow of material from the chute 106 through the spout 118 soon after the hopper 54 is filled slightly above the level of the spout opening 120.

The gravity chute 106 has no bottom opening other than the spout 118. In order to insure the flow of all material reaching the bottom of the chute 106 to the spout 118, the chute bottom 122 is downwardly inclined toward the spout and serves substantially as a continuation of the bottom wall of the spout.

An adjustable gate 124 may be located in one or more of the spouts 110—118. Such a gate is shown in Fig. 4 with a manipulating portion 126 by which the vertical position of the gate can be adjusted. Gate 124 can thus serve as an auxiliary means for controlling the rate of flow to the hopper 54 and can thus assist the action of the overlapping spout and hopper portions in cutting off the flow when the level within the hopper rises above the mouth 120 of the spout.

According to the present invention, the material entering the gravity chute 106 through its inlet 108 is fed selectively first to the bottom spout 118 and hopper 54 and subsequently to the sucessive spouts and hoppers vertically spaced above the lower units. A baffle 128 is located within chute 106 above the entrance to upper spout 110. This baffle 128 thus diverts material to the opposite side of chute 106 and prevents accidental flow of material into the upper spouts and hoppers until the desired volume rate of flow is achieved at the lowermost spouts and hoppers. In this particular case, all of the spouts are vertically aligned at one side of the chute 106 and baffle 128 thus diverts material from all of the spout openings until the material has backed up to the desired level as discussed below.

In operation, with the respective feed gates adjusted to the desired optimum volume rate of flow for the particular processing units, material will initially be fed from the chute inlet 108 through the vertical or gravity chute 106 to the lowermost feed spout 118 and hopper 54. If the volume rate of flow of such material is such that it can be substantially accommodated by the lower feed deck 44 and its processing unit, the situation will remain substantially as illustrated in Fig. 4. Here the material 129 may accumulate to a slight extent within hopper 54 but will be fed through the hopper feed opening 59 at a volume rate sufficient to prevent the material 129 from building up above the level of the spout mouth 120.

When the volume rate of flow of material into gravity chute 106 is substantially greater than can be accommodated by one or more of the lower processing units, the situation will approach the condition illustrated in Fig. 5. Here the volume rate of flow to the lowest spout has exceeded that which can be accommodated by the lower hopper feed opening and the material has accordingly accumulated in the lower hopper to a level above the mouth 120 of the spout 118 and has thus choked off the further flow of material through such spout. The material has accordingly backed up in the gravity chute 106 until it reached the level of the next higher spout 116.

The material has then accumulated in hoper 52 and has been discharged therefrom until the optimum or maximum rate of flow permitted by the feed opening of hopper 52 has been reached. The material then backs up in the hopper 52 above the level of the lower opening of spout 16 and thus chokes off further feed to this hopper except to the extent needed to maintain said optimum volume rate of flow.

Similarly, material will then back up in the chute 106 to the next higher spout level 114. If the volume rate of flow exceeds that which can be accommodated by all of the hoppers and processing units, the surplus material can be discharged through a discharge or overflow opening 130 located in the gravity chute 106 at a level above the uppermost spout 110 and below the inlet 108. The material which passes through discharge opening 130 is then received in a discharge chute 132 which may extend downwardly to a lower end 134 from which the excess material is fed either to another processing unit or to a collection or storage unit.

A baffle 136 is located above discharge opening 132 to insure the initial flow of material from inlet 108 past the discharge opening 130 until the gravity chute 106 is filled sufficiently to maintain all of the feed spouts 110, 112, 114, 116, and 118 and their respective hoppers in operation at optimum or maximum volume rates of flow. In this case the discharge opening 130 is in the wall of chute 106 opposite the wall in which the various feed spouts are located and baffle 136 initially directs some of the material toward the side of the chute where the feed spouts are located. Thus the baffle 128 previously mentioned is important as a means of redirecting the material downwardly in the chute away from the spout openings 110 after the discharge opening 130 has been passed.

In certain applications it is preferable to provide for vibration of the individual feed hoppers and feed decks in order to facilitate the flow of material from the hoppers at the desired volume rate. As shown in Fig. 1, for example, the lower frame member 30 of the multiple processing unit may be supported on inclined springs 138 connected to the frame at their upper ends as shown at 140. Springs 138 in turn have their lower ends supported at 142 on a suitable base 144. Because of the particular arrangement of the spring supports, it will then be possible to vibrate the frame member 30 and the associated feed decks and hoppers along a path indicated by arrow 146 which is substantially perpendicular to the plane of the springs 138.

To provide this vibration the frame member has a suitable bearing 148 at its rear. A connecting rod 150 is pivoted at 152 to bearing 148 to transmit the necessary vibrational force from an eccentric 154 on a shaft 156. Shaft 156 is driven by a suitable motor in gear casing 158 and is rotatably mounted in bearings 160 on an auxiliary frame 162 attached to main frame or base 144.

In the preferred form shown in the drawing, the construction just described provides for rapid vibration of the respective feed decks and hoppers in the direction indicated. The flow of material through the feed gates and openings of the respective hoppers and across the feed decks will thus be facilitated. In this preferred form, however, the gravity chute 106 is separately mounted and is stationary during vibration of the individual feed hoppers. Thus the gravity chute may be supported at its upper end on a suitable frame member or portion of the building 164 as indicated at 166, while the lower portions of the gravity supply and discharge chutes may be carried by additional frame or building members 168 as shown at 170.

In this construction the respective hopper inlet openings such as opening 104 in Fig. 4, must be large enough to accommodate the various discharge spouts such as spout 118 in all positions of vibration of the hoppers and associated parts. At the same time, as pointed out above, the relative space left around the discharge spouts within the hoppers should be small enough to assist in choking off the feed through a particular spout once the hopper is operating at its optimum volume rate of flow.

The particular combination of the stationary gravity chute 106 and the vibrating feed hoppers is particularly advantageous in carrying out the present invention since the desired blocking and choking effect of the material within the feed spouts and gravity chute is best achieved when such chute is stationary, and especially where a separate adjustable gate is located in the feed spouts as at 124. Such a gate serves to limit the maximum volume rate of flow through the hopper to a volume rate only slightly greater than that at which material is fed from the corresponding hopper and thus assists in choking the flow and diverting it to the upper spouts. At the same time, the individual supply hoppers are free to vibrate to facilitate the discharge of material from the hoppers and the continued supply of material from the feed spouts at a rate just sufficient to equal the volume rate of flow from the hoppers.

The feeding mechanism described above thus provides a means for accomplishing the object set forth at the beginning of the present specification and distributes the material successively from one feed hopper and processing unit to another, depending upon the relative volume rate at which material is supplied to the feeding mechanism, and the individual volume rates at which material is fed to the processing units by their respective feed hoppers. Once the optimum volume rate for a particular processing unit and hopper is set on the adjustable gate mechanism, the device offers assurance that all material will be fed to one of the processing units until that unit is operating at its optimum capacity. An increase in the volume rate of flow above such capacity will then result in the automatic diversion of subsequent material successively to another feeding hopper and processing unit and, if necessary, to further hoppers and processing units as described. The adjustable gate mechanism of the present invention offers means for individual adjustment of the respective gates and also for simultaneous adjustment of all the gates at one time.

Since minor variations and changes in the exact details of construction will be apparent to persons skilled in this field, it is intended that this invention shall cover all such changes and modifications as fall within the spirit and scope of the attached claims.

We claim as our invention:

1. A feeding mechanism for distribution of granular or free-flowing solid materials, said mechanism comprising a plurality of feed hoppers, each hopper having a restricted discharge opening through which material is fed at a predetermined volume rate, a common feed chute for supplying material to all of said hoppers, and material distributing means automatically and selectively supplying all of the material to one predetermined hopper whenever the total volume rate of material passing through the feed chute is no greater than the full volume rate at which said one predetermined hopper is set to feed it, said material distributing means including means automatically responsive to the feeding of material through the chute in excess of said volume rate for diverting such excess material to a second predetermined hopper only when the material reaches the material discharging means more rapidly than said predetermined volume rate, until the second hopper is also discharging at its full volume rate.

2. Feeding mechanism for distribution of granular or free-flowing comminuted solid material to a plurality of processing units, said mechanism comprising a substantially vertical gravity chute having an inlet opening at its top and a plurality of vertically spaced discharge spouts along the chute with at least one spout for each unit, the chute being closed at its bottom except for the lowest spout, and having an overflow opening for excess material, said overflow opening being located between the uppermost spout and inlet opening, said chute having an internal baffle within the chute above one of the upper spouts, said baffle being inclined downwardly toward the opposite side of the chute and thereby guiding material away from said upper spout until all lower spouts are operating at full capacity.

3. Feeding mechanism according to claim 2 in which all of said spouts are on the same side of the chute and said baffle is located above the uppermost spout.

4. Feeding mechanism according to claim 3 in which the overflow opening is located on the opposite side of the chute from said spouts and at a level above said baffle.

5. Feeding mechanism for distribution of material comprising the combination of a plurality of vertically spaced hoppers, each hopper having means for controlled discharge of material at predetermined volume rates, and an upwardly-facing filling opening, and a vertical chute having vertically spaced spouts, one of which spouts projects downwardly from the chute into the filling opening of each hopper, said vertical chute being closed at its bottom except for the lowest spout, and having an overflow opening for excess material, said overflow opening being located above the uppermost spout, and the relative size of said vertical chute providing a maximum potential volume rate of flow of material in the chute which is greater than the volume rates at which material is discharged from the individual hoppers.

6. Feeding mechanism according to claim 5 having means for vibrating each of said hoppers.

7. Feeding mechanism according to claim 6 in which said chute is stationary.

8. Feeding mechanism according to claim 5 having a movable discharge gate for each hopper, a common control member to which each of said gates is connected, means for adjustment of the position of the control member for simultaneous adjustment of the gates, and adjustable means connecting each gate to said common control member for separate adjustment of each individual gate with respect to the remaining gates and common control member.

9. Feeding mechanism for distribution of material, said mechanism comprising the combination of a plurality of vertically spaced feed decks, a hopper on each feed deck having a feed opening for discharging material from the hopper along the deck at a predetermined maximum volume rate and also having hopper walls projecting upwardly on all sides above the top of said opening, and a vertical chute having vertically spaced spouts, one of which projects downwardly from the chute into each hopper to a level below the tops of the hopper walls, said vertical chute being closed at its bottom except for the lowest spout, and having an overflow opening for excess material, said overflow opening being located above the uppermost spout.

10. Feeding mechanism according to claim 9 having means for vibrating said feed decks and means holding said chute stationary.

11. Feeding mechanism according to claim 9 having an adjustable gate in at least one of said spouts limiting the volume rate of material passing through the spout to its corresponding hopper, said gate limiting the passage of material through the spout to a maximum volume rate only slightly greater than the volume rate at which the corresponding hopper can discharge such material through its feed opening.

12. Feeding means according to claim 9 having a baffle within said chute above the uppermost spout, said baffle guiding material to the side of the chute away from the spout and thereby insuring passage of material to the lower spouts before any of such material passes through the upper spouts.

13. Feeding mechanism for distribution of granular or free flowing comminuted solid material, said mechanism comprising the combination of a plurality of vertically-spaced feed hoppers, a vertically-movable gate associated with each hopper and providing a variable feed opening for discharge of material from the hopper, a vertically-movable control member, adjustable means connecting each gate to the control member and providing means for separate vertical adjustment of each individual gate and feed opening with respect to the control member and remaining gates, and setting means for adjusting the vertical position of the control member and thereby varying simultaneously the position of all of said gates, said control member being resiliently moved downwardly and said setting means including an adjustable stop limiting said downward movement.

14. Feeding mechanism for distribution of granular or free flowing comminuted solid material, said mechanism comprising the combination of a plurality of vertically-spaced feed hoppers, a vertically-movable gate associated with each hopper and providing a variable feed opening for discharge of material from the hopper, a vertically-movable control member, adjustable means connecting each gate to the control member and providing means for separate vertical adjustment of each individual gate and feed opening with respect to the control member and remaining gates, setting means for adjusting the vertical position of the control member and thereby varying simultaneously the position of all of said gates, a common feed chute for said hoppers and means feeding material selectively from the chute to one predetermined hopper until the latter is discharging at the full volume rate provided by its gate opening, said feeding means then automatically diverting material in excess of said volume rate to a second predetermined hopper until the latter is also discharging at its full volume rate.

References Cited in the file of this patent

UNITED STATES PATENTS

| 134,399 | Rowland | Dec. 31, 1872 |
| 1,176,064 | Kavanagh | Mar. 21, 1916 |
| 1,224,241 | Van Ness | May 1, 1917 |
| 1,234,221 | Russell | July 24, 1917 |
| 1,448,303 | Kendall | Mar. 13, 1923 |
| 1,455,301 | Mettler | May 15, 1923 |
| 1,921,577 | Nelson | Aug. 8, 1933 |
| 2,276,382 | Francis | Mar. 17, 1942 |
| 2,340,190 | Kohout | Jan. 25, 1944 |
| 2,415,900 | Myles | Feb. 18, 1947 |
| 2,577,315 | Ellerbeck | Dec. 4, 1951 |
| 2,588,030 | Musschoot et al. | Mar. 4, 1952 |

FOREIGN PATENTS

| 1,287 | Great Britain | Apr. 8, 1873 |